United States Patent [19]
Schuler

[11] Patent Number: 5,601,362
[45] Date of Patent: Feb. 11, 1997

[54] VERTICAL FEED MIXER WITH FEED DEFLECTORS

[75] Inventor: Reggie L. Schuler, Griswold, Iowa

[73] Assignee: Schuler Manufacturing & Equipment Co., Inc., Griswold, Iowa

[21] Appl. No.: 658,169

[22] Filed: Jun. 4, 1996

[51] Int. Cl.$^6$ .................................................. B01F 7/00
[52] U.S. Cl. ...................... 366/309; 366/323; 366/325.1
[58] Field of Search .................................. 366/603, 279, 366/266, 262, 264, 319, 309, 310, 311, 312, 318, 323, 325.1

[56] References Cited

U.S. PATENT DOCUMENTS

| | | | |
|---|---|---|---|
| 3,133,727 | 5/1964 | Luscombe | 366/266 |
| 5,429,436 | 7/1995 | Stone | 366/603 |
| 5,462,354 | 10/1995 | Neier | 366/603 |

*Primary Examiner*—Robert W. Jenkins
*Attorney, Agent, or Firm*—Zarley, McKee, Thomte, Voorhees, & Sease

[57] ABSTRACT

An improved vertical feed mixer has a mixing chamber defined by a floor, a sidewall, and an open upper end through which feed material, such as hay bales, is loaded into the chamber. A vertically disposed auger with tapered flighting is rotatably mounted within the chamber for cutting, mixing, and discharging the feed material through a discharge opening near the bottom of the chamber. A plurality of grader blades extend outwardly from the auger shaft in close proximity to the bottom wall of the mixing chamber, thereby pushing mixed feed outwardly through the discharge opening a plurality of times during each revolution of the auger, thereby providing increased uniformity of the discharge flow of material into a feed bunk or trough. A primary deflector extends along the perimeter edge of the flighting adjacent the leading edge thereof. The secondary deflectors are spaced along the perimeter edge of the flighting. The primary and secondary deflectors extend substantially parallel to the perimeter edge of the flighting. The ends of the grader blades have angularly disposed scrapers attached thereto. The primary deflector and scrapers pull feed material away from the sidewall of the mixer and direct the material inwardly towards the auger shaft. The secondary scrapers further direct feed material toward the auger shaft as the material flows upwardly along the auger flighting. The movement of the feed material towards the center of the mixer enhances the mixing operation.

20 Claims, 3 Drawing Sheets

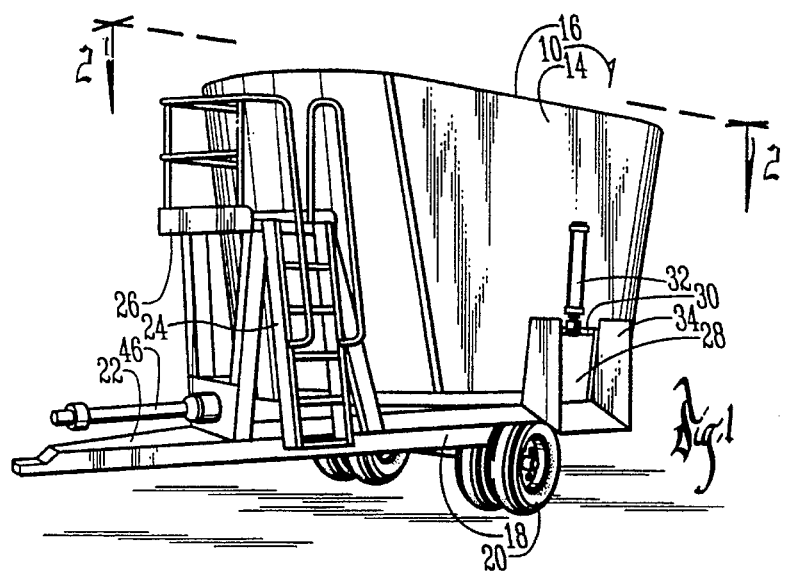
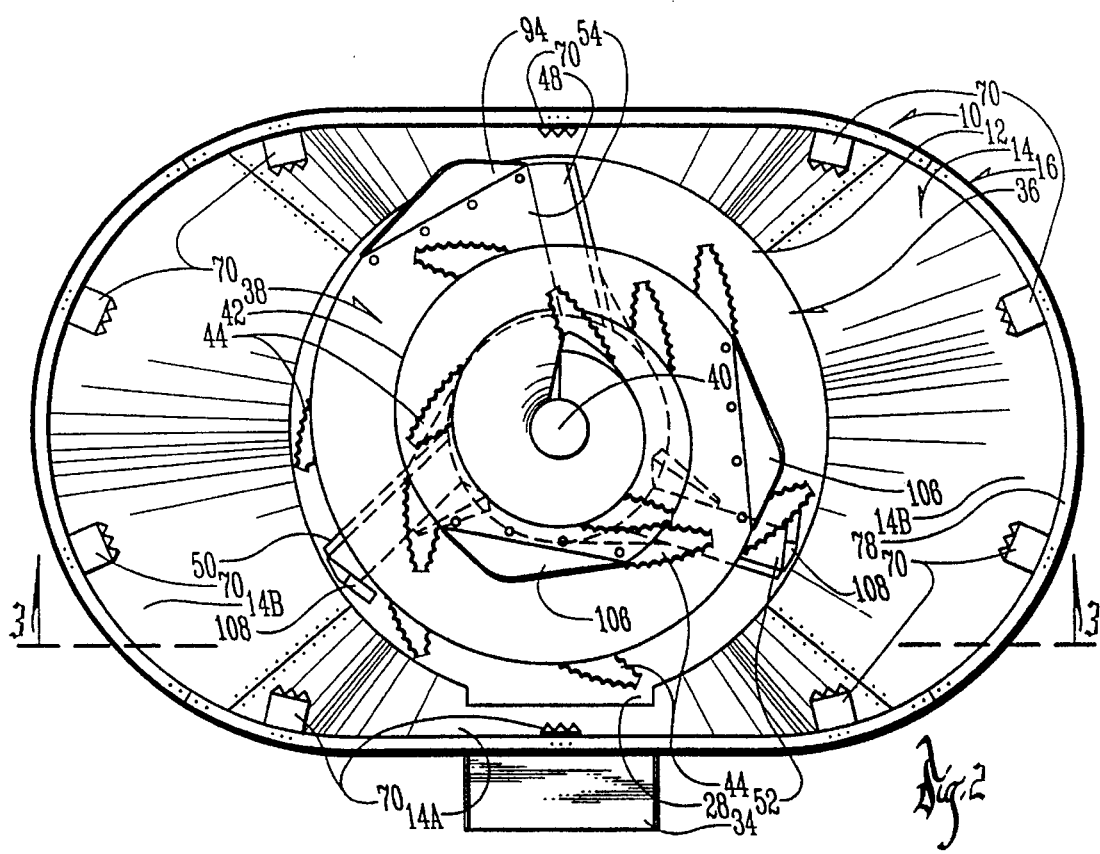

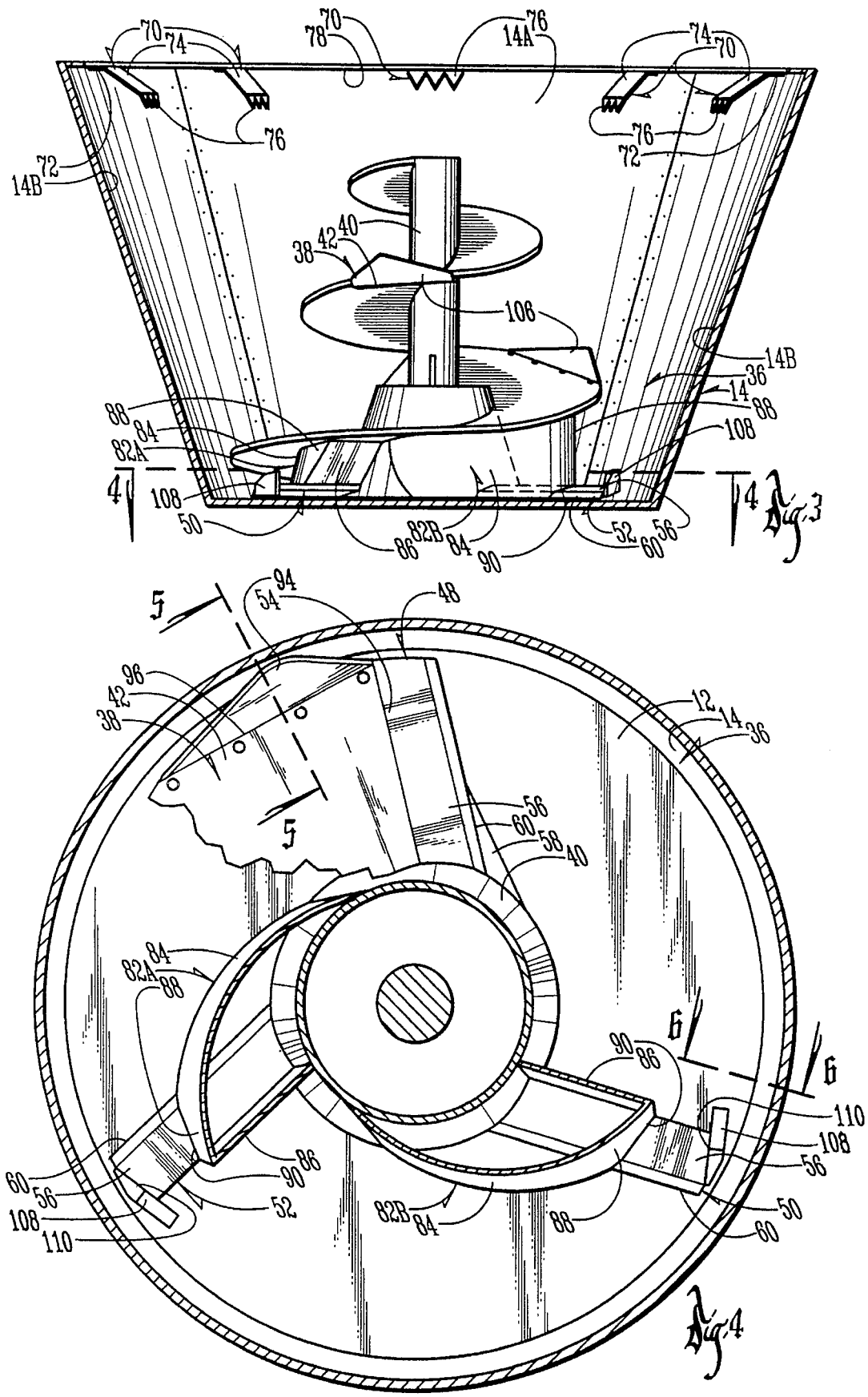

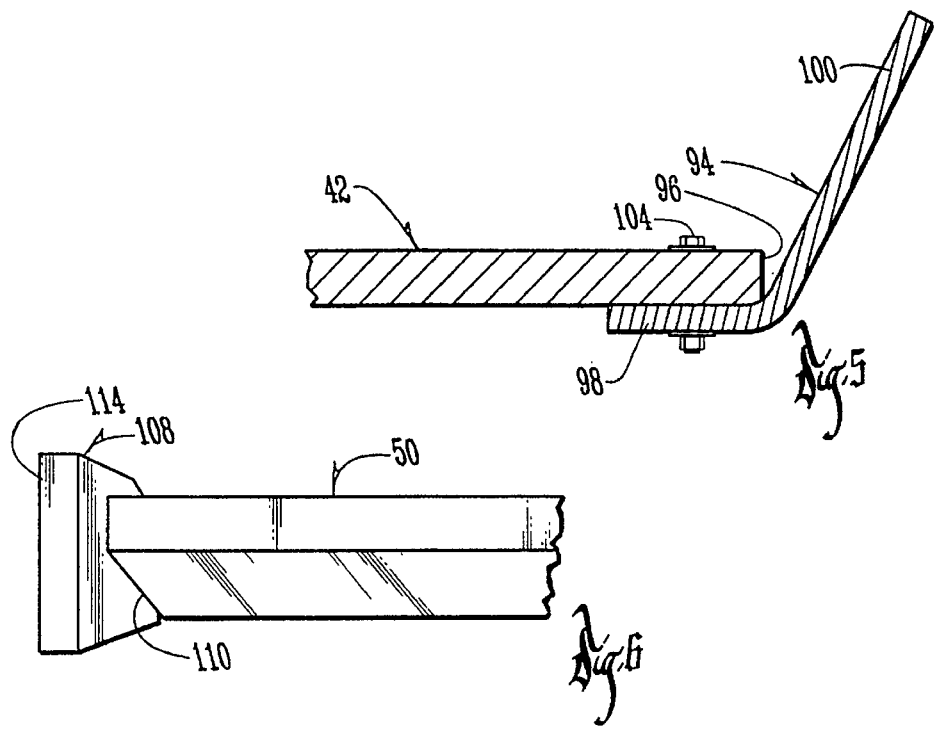
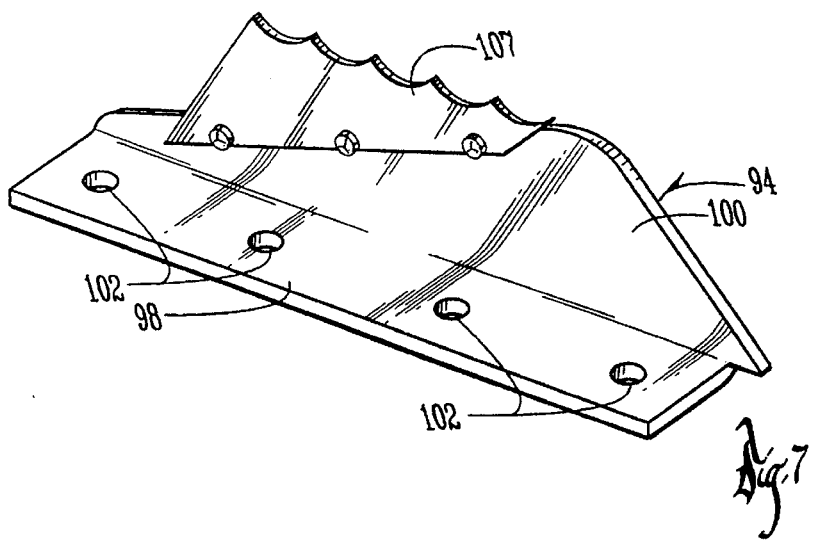
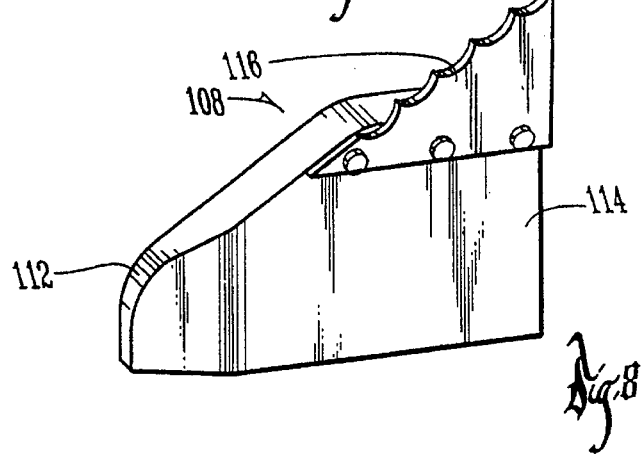

VERTICAL FEED MIXER WITH FEED DEFLECTORS

BACKGROUND OF THE INVENTION

Vertical feed mixers are known for cutting and mixing hay, forage and other feed ingredients, and for discharging the mixed composition into cattle feed bunks. These prior art vertical feed mixers include a floor and a sidewall defining a mixing chamber with a vertically disposed auger therein. Knife blades are typically mounted on the outer edge of the auger flighting so as to cut hay and forage that is deposited into the chamber from the open upper end. A discharge opening at the lower end of the mixing chamber allows the mixed feed composition to be pushed outwardly by the leading edge of the rotating auger.

In the vertical mixer industry, it is known that mixing is improved within the mixing chamber by directing the feed material inwardly toward the center of the auger. By directing the feed flow toward the center of the auger, the full width of the flighting is utilized so as to increase the amount of feed lifted by the auger. Therefore, a greater volume of feed is pulled and lifted from the bottom of the feeding chamber by the auger and moved upwardly to the top of the auger where the feed material spreads outwardly and falls downwardly along the opposite ends of the mixing chamber. This percolation process is repeated many times during a mixing cycle and is important to produce thorough mixing of the feed material. The directing of the feed material inwardly towards the center of the auger as it is lifted by the auger flighting decreases the mixing time, reduces fuel or energy consumption, and minimizes wear on the mixer components.

U.S. Pat. No. 5,456,416 discloses a plate mounted angularly across the lower flighting adjacent the leading edge to direct feed material towards the auger mandrel or shaft. Such a deflector plate mounted across the flighting requires increased horsepower for auger rotation. Also, the angularly disposed deflector of U.S. Pat. No. 5,456,416 is also subjected to increased wear from the flow of feed material over the deflector.

Accordingly, a primary objective of the present invention is the provision of an improved vertical feed mixer and method for mixing feed material.

A further objective of the present invention is the provision of a vertical feed mixer having one or more deflectors to direct feed material inwardly toward the auger mandrel.

Still another objective of the present invention is the provision of a vertical feed mixer having a plurality of feed deflectors extending substantially parallel to the peripheral edge of the auger flighting to scrape feed material from the sidewall of the mixing chamber and to direct the material inwardly along the flighting.

Another objective of the present invention is the provision of an improved vertical feed mixer having scrapers for pulling or scraping feed material from adjacent the sidewall of the mixer.

Another objective of the present invention is the provision of an improved vertical feed mixer which is economical to manufacture and durable and efficient in use.

These and other objectives will become apparent from the following description of the invention.

SUMMARY OF THE INVENTION

The improved vertical feed mixer of the present invention includes a floor and a sidewall which define a mixing chamber. The upper end of the chamber is open so as to receive the feed material to be cut and mixed, such as round or square bales of hay, forage and other feed supplements and ingredients. A discharge opening is provided in the sidewall adjacent the floor, with a door movable between open and closed positions. An auger is rotatably mounted within the chamber, with a vertically disposed shaft and tapered flighting. The flighting includes a plurality of knife blades for cutting the hay.

According to the present invention, a first feed deflector is mounted or formed on the peripheral edge of the auger flighting adjacent the leading edge thereof. The deflector extends substantially parallel to the peripheral edge of the flighting and upwardly from the upper surface of the flighting. This first deflector scrapes feed material from the sidewall of the mixing chamber and directs the feed material inwardly towards the auger shaft or mandrel. Additional deflectors may be spaced along the peripheral edge of the auger flighting to further direct feed material inwardly as the feed material is lifted by the flighting.

One or more grader bars extend outwardly from the auger mandrel adjacent the floor of the mixing chamber. Each of the grader bars includes a scraper at the outer end of the bar. The scrapers are in close proximity to the mixing chamber sidewall so as to scrape feed material from the sidewall, and to move the feed material from the sidewall inwardly for lifting by the flighting. New feed material slides downwardly into the area immediately vacated by the action of the scraper. The newly displaced feed material is then picked up by the auger flighting on the next revolution of the auger.

BRIEF DESCRIPTION OF THE DRAWINGS

FIG. 1 is a perspective view of a vertical feed mixer.

FIG. 2 is a top plan view taken along lines 2—2 of FIG. 1.

FIG. 3 is a sectional view taken along lines 3—3 of FIG. 2.

FIG. 4 is a sectional view taken along lines 4—4 of FIG. 3.

FIG. 5 is a sectional view taken along lines 5—5 of FIG. 4.

FIG. 6 is a partial sectional view taken along 6—6 of FIG. 4.

FIG. 7 is a perspective view of the primary flighting deflector of the present invention.

FIG. 8 is a perspective view of a grader bar scraper of the present invention.

DETAILED DESCRIPTION OF THE DRAWINGS

With reference to the drawings, a vertical feed mixer is generally designated by the reference numeral 10. The mixer includes a bottom wall or floor 12, a sidewall 14, and an open upper end 16. The mixer 10 is mounted upon a frame 18, including wheels 20. A tongue 22 extending from the frame is adapted to be hitched to a tractor or other prime mover. A ladder 24 is provided on the frame 18, with a platform 26 so that a person can look into the open upper end 16 of the mixer 10. The sidewall 14 includes a discharge opening 28, with a discharge door 30 movable between open and closed positions by a hydraulic cylinder 32. A discharge chute 34 extends outwardly adjacent the discharge opening 28.

The floor 12 and the sidewall 14 define a mixing chamber 36. An auger 38 is rotatably mounted within the mixing chamber 36, and includes a vertically disposed shaft 40 with a tapered flighting 42. A plurality of knife blades 44 extend from the peripheral edge of the flighting 42 for cutting feed material, such as round or square hay bales, loaded into the open upper end 16 of the mixer 10. The drive train 46 for rotating the auger 38 is operatively connected to the PTO of the tractor. The sidewall 14 is oval or oblong in cross section adjacent the top of the mixer 10, as seen in FIG. 2. Thus, the sides 14A of the sidewall are closer to the auger than are the ends 14B of the sidewall. The sidewall 14 is also tapered along its height, such that the mixing chamber 36 has an inverted conical shape. More particularly, the sidewall 14 tapers downwardly and is substantially circular in cross section adjacent the floor 12, as seen in FIG. 4.

The above description of the vertical feed mixer 10 is conventional, and does not constitute a part of the present invention.

A plurality of grader blades 48, 50, 52 are provided on the lower end of the auger 38 to enhance the discharge of mixed feed from the mixing chamber 36 through the discharge opening 28. As best seen in FIG. 4, the grader blade 48 is welded or otherwise secured to the leading edge 54 of the flighting 42. The other grader blades 50, 52 are spaced 120° from one another and from the grader blade 48. The grader blades 50, 52 each include an elongated arm 56 extending outwardly from the base of the auger shaft 40, with reinforcing braces 58 providing structural support between the arms 56 and the base of the auger shaft 40. Preferably, each arm 56 is angled slightly rearwardly, approximately 10°–20° as shown in FIG. 4, with respect to a radius. The grader blades 48, 50, 52 include a beveled leading edge 60 which is in close proximity to the floor 12 of the mixer 10. The grader blades 48, 50, 52 are made from hardened abrasion resistant steel.

A plurality of hay claws 70 are attached to the mixing chamber 36 adjacent the upper end 16 thereof. The hay claws 70 extend inwardly so as to catch or grip hay bales, or portions thereof, in the mixing chamber 36. More particularly, each hay claw 70 includes a securing flange 72, a body portion 74, and one or more projections or prongs 76, as best seen in FIG. 3. Preferably, each hay claw 70 is of one-piece construction, and made from a rigid material, such as ⅜" plate steel. As seen in FIG. 3, the securing flange 72 and the prongs 76 are angularly disposed with respect to the body portion 74. Thus, the prongs 76 extend inwardly and downwardly from the upper edge of the mixing chamber 36. The securing flange 72 is attached to a lip 78, or directly to the sidewall 14 in any convenient manner, such as with nuts and bolts. Alternatively, the hay claws 70 can be welded to the upper edge of the mixing chamber 36.

It is noted that a shortened hay claw is used on the sides 14A of the chamber 36, as seen in FIG. 2. The shortened claws include a securing flange 72 and prongs 76, but do not have a body portion between the flange and prongs.

Flighting plows are provided to prevent feed material from becoming plugged between the lower most section of the flighting 42 and the floor 12 of the mixing chamber 36. Preferably, a pair of plows 82A and 82B are provided, however a single elongated plow or a plurality of shortened plows may be employed. Each plow 82A, 82B includes a curved vertical wall 84 which extends from the auger shaft or mandrel 40 toward the outer perimeter edge of the flighting 42. The height of the curved wall 84 is sufficient to extend substantially between the floor 12 and the underside of the flighting 42. As seen in FIG. 3, the height of the wall 84 increases in accordance with the slope of the auger flighting 42, due to the curvature of the wall 84. Each plow 82A, 82B also includes a vertical back wall 86 which extends substantially radially from the outer or trailing edge 88 of the curved wall 84 inwardly to the auger shaft 40. The back wall 86 encloses the area behind the curved wall 84 to prevent feed material from accumulating therein.

Preferably, two plows 82A and 82B are provided for the mixer 10. One of the plows 82A extends substantially from the grader blade 48 to the grader blade 52. The second plow 82B extends substantially between the grader blades 52 and 50. As seen in FIGS. 3–5, the trailing edge 88 of each curved wall 84 has a notch 90 cut out so as to accommodate the respective grader blades 50, 52.

The present invention is directed towards various deflectors used to direct the feed material inwardly upon the auger flighting toward the auger shaft or mandrel. More particularly, a primary deflector 94 extends along the perimeter edge 96 of the flighting 42 adjacent the leading edge 54 thereof. The deflector 94 is elongated and extends substantially parallel to the perimeter edge 96 of the flighting 42. Preferably, the edge 96 of the flighting 42 is cut or otherwise formed into a straight line, as best seen in FIG. 4, so as to simplify the manufacture and assembly of the deflector 94. As further seen in FIG. 4, the deflector 94 extends into close proximity with the sidewall 14 of the mixer 10 so as to scrape feed material from the sidewall and direct the material inwardly upon the flighting towards the auger shaft 40.

The primary deflector 94 includes a mounting leg or flange 98 and an upwardly extending blade 100. The mounting flange 98 includes a plurality of holes 102 which permit the deflector 94 to be removably mounted to the flighting 42 via nut and bolt assemblies 104. Alternatively, the deflector 94 can be welded to the flighting, or formed by an upwardly bent edge portion of the flighting. The blade 100 of the primary deflector 94 extends into close proximity to the sidewall 14 of the mixer 10, as best seen in FIG. 4. Thus, the deflector 94 scrapes feed material from the sidewall 14 and directs the material inwardly toward the auger shaft 40.

If desired, secondary deflectors 106 may be mounted upon the auger flighting 42 at spaced apart intervals along the perimeter edge 96 of the flighting 42, as seen in FIGS. 2 and 3. The secondary deflectors 106 have a similar construction to the primary deflector 94, but may be smaller in dimensions. The secondary deflectors 106 also direct feed material inwardly across the width of the flighting 42 toward the auger shaft 40 so as to enhance mixing of the feed material. Knives 107 may be provided on the primary deflector 94 and/or secondary deflectors 106 so as to further cut the feed material during the mixing operation.

Each of the grader blades 50, 52 has a scraper 108 mounted on the outer end thereof. Preferably, the scrapers 108 are welded to the grader blades 50, 52, but alternatively may be bolted to the grader blades, or formed by upwardly bending the end of the grader blade. As best seen in FIG. 4, the outer end 110 of the grader blades 50, 52 is angled, relative to the longitudinal axis of the grader blades. Thus, the scrapers 108 are angled inwardly from the leading edge 112 to the trailing edge 114 thereof. The scrapers 108 are in close proximity to the sidewall 14 of the mixer 10 so as to scrape feed material away from the sidewall. The angular orientation of the scrapers 108 directs the scraped feed material inwardly towards the auger shaft 48 for pickup upon the next revolution of the auger flighting 42. Knives 116 may be provided on the scrapers 108 to facilitate cutting of the feed material during the mixing operation.

In operation, hay or other long grain forage feed material is loaded into the open upper end 16 of the mixer 10 while the auger 38 is rotating. The knife blades 44 cut and slice the hay or forage, even if large round or square bales are loaded into the mixer 10. Additional feed supplements or ingredients may also be added into the mixing chamber 36 for mixture with the hay or forage. As shown in the drawings, the auger 38 rotates in a clockwise direction. Due to the oblong or oval shape of the mixing chamber 36, the hay tends to migrate downwardly at the ends 14B of the sidewall 14 and migrate upwardly adjacent the opposite sides 14A of the mixing chamber. This upward and downward flow of the hay and other feed material provides a percolation which enhances the cutting and mixing operation. Thus, as feed material falls to the bottom of the mixing chamber 36, the flighting 42 on the auger 38 lifts the material upwardly so as to create a continuous fountain-type flow of material through the mixing chamber 36. During this mixing operation, the discharge door 38 is closed so that no feed material is discharged through the opening 28.

As the auger 38 rotates, the primary deflector 94 and the scrapers 108 pull feed material from adjacent the sidewall 14 of the mixer 10 and direct the feed material inwardly towards the auger shaft 40 for lifting by the flighting 42. This movement of the feed material inwardly from the sidewall allows additional feed material to flow downwardly for subsequent scraping and deflecting action by the primary deflector 94 and the scrapers 108. The secondary deflectors 106 also direct the feed material inwardly towards the auger shaft as the material flows upwardly along the flighting 42. Since the deflector 94 is substantially parallel to the perimeter edge 96 of the flighting 42, the deflector 94 tends to slice through the feed material, thereby lowering the horsepower requirements of the mixer 10.

The hay claws 70 prevent the percolating hay and feed material from spilling over the upper edge of the mixing chamber 36. Also, the prongs 76 of the hay claws 70 catch or grip the hay or other long grained forage material to prevent rotation of the hay with the auger 38. Thus, the hay will not rotate at the same rpm as the auger 38. This temporary holding of the hay allows the knives 44 on the auger 38 to cut the hay or hay bale, which will then continue the percolating flow through the mixing chamber 36. Thus, the time for the cutting and mixing operation to be completed is minimized.

As the auger 38 rotates, feed material at the bottom of the mixing chamber 36 below the flighting 42 tends to migrate inwardly towards the auger shaft 40. The plows 82A and 82B direct such material outwardly away from the shaft so as to prevent plugging of such material between the underside of the lower-most section of the flighting 42 and the floor 12 of the mixing chamber 36. Thus, the mixing dead spot is eliminated by the plows 82, and the formation of undesirable plugs of feed material is inhibited or eliminated by the plows 82.

Upon completion of the mixing operation, the hydraulic cylinder 32 is actuated so as to open the door 30 such that mixed feed can be discharged through the opening 28. After the door 30 is opened, the auger 38 rotates in a clockwise direction such that the grader blades 48, 50, 52 push mixed feed outwardly through the opening 28 whereby the mixed feed falls down the discharge chute 34 into a feed bunk or trough (not shown). The close proximity of the leading edge 60 of the grader blades 48, 50 and 52 to the floor 12 of the mixer 10 allows the grader blades to scrape material from the floor of the mixing chamber for discharge through the discharge opening 28. As best seen in FIG. 5, the grader blades are inclined slightly from front to back, so as to impart a lifting action or motion to the feed material. Also, the rearward angular orientation of the longitudinal axis of the arm 56 of each grader blade relative to a radius facilitates the pushing of mixed feed out the discharge opening 28. The beveled leading edge 60 of the grader blades also reduces the torque required to push the blades through the feed material. The scrapers 108 also facilitates the discharge of the feed through the opening 28 by dislodging the feed material adjacent the sidewall 14 of the mixer 10.

Preferably, during the cutting, mixing and discharge operations, the auger 38 is rotated between 20–35 revolutions per minute. For quick clean-out of residual feed material from the mixing chamber 36, the auger 28 may be rotated up to 40 rpm. Preferably, the rotational speed of the auger may vary depending upon the type of feed material being cut and mixed.

Thus, with the three grader blades shown in the drawings, feed is pushed out of the mixing chamber three times during each revolution of the auger 38. In the absence of grader blades 50 and 52, the feed material would be pushed out of the mixing chamber by the leading edge of the flighting only once during each revolution of the auger. Thus, the plurality of grader blades provides a more uniform discharge of mixed feed material from the mixing chamber 36.

A further advantage of the grader blades is the reduction of time required to clean out the mixing chamber 36 of the few remaining pounds of feed material. Thus, the operator saves time and reduces wear on the mixer by reducing the number of revolutions of the auger needed to clean out the mixing chamber between feed batches.

It is understood that the number of grader blades and plows may be varied from that shown in the drawings and described above. For example, with two grader blades spaced 180° apart, a single plow would be utilized, and the mixed feed would be discharged from the mixing chamber twice during each revolution of the auger 38. Four, five or six grader blades can also be utilized, with the blades being substantially equally radially spaced from one another, so as to further increase the frequency of the mixed feed discharge from the mixing chamber. With such multiple blades, a plow 82 extends between adjacent grader blades.

Also, a stationary vertical feed mixer having grader blades can be used with conveyor type feed systems.

The vertical feed mixer with the grader blades provides for a more uniform discharge flow of feed material during the discharge operation. Therefore, a more even distribution of feed material in the feed trough is achieved, such that all the animals will have an opportunity to consume equal amounts of feed. For example, with the three grader blades as shown in the drawings, a tractor moving at 2 miles per hour along a feed trough with the auger screw rotating at 15 rpm will move 3.9 feet along the trough between each push of feed material, as compared to 11.72 feet of longitudinal movement per revolution of the auger screw when only the leading edge of the flighting is pushing feed material through the discharge opening. With 4–6 grader blades, the distance of travel of the tractor along the feed trough between each feed material push is further decreased per auger revolution. Also, the plows prevent feed plugs which prevent potential hazards to feeding animals and inaccurate feed records.

Whereas the invention has been shown and described in connection with the preferred embodiments thereof, it will be understood that many modifications, substitutions, and additions may be made which are within the intended broad scope of the following claims. From the foregoing, it can be seen that the present invention accomplishes at least all of the stated objectives.

What is claimed is:

1. An improved vertical feed mixer having a floor and a sidewall defining a mixing chamber with an open upper end and a discharge opening, and a vertically oriented auger rotatably mounted within the mixing chamber, the auger including a shaft and flighting with a leading edge and a peripheral edge, the improvement comprising:

a deflector extending along the peripheral edge of the flighting so as to direct feed material inwardly toward the shaft.

2. The improved vertical feed mixer of claim 1 wherein the deflector is adjacent the leading edge of the flighting.

3. The improved vertical feed mixer of claim 1 wherein the deflector is substantially parallel to the peripheral edge of the flighting.

4. The improved vertical feed mixer of claim 1 wherein the deflector includes a mounting flange adapted for attachment to the flighting and a blade extending upwardly above the flighting.

5. The improved vertical feed mixer of claim 1 further comprising a plurality of secondary deflectors mounted in spaced relation along the peripheral edge of the flighting.

6. The improved vertical feed mixer of claim 1 further comprising a grader blade extending from the auger shaft adjacent the floor of the mixer, the blade having an outer end with a substantially vertically disposed scraper for engaging feed material adjacent the sidewall of the mixer.

7. The improved vertical feed mixer of claim 6 wherein the scraper has opposite leading and trailing edges and is angled inwardly from the leading edge to the trailing edge to direct feed material inwardly.

8. An improved vertical feed mixer according to claim 1 further comprising a knife on the deflector to cut the feed material.

9. An improved vertical feed mixer having a floor and a sidewall defining a mixing chamber with an open upper end and a discharge opening, and a vertically oriented auger rotatably mounted within the mixing chamber, the auger including a shaft and flighting with a leading edge and a peripheral edge, the improvement comprising:

a grader blade extending from the auger shaft adjacent the floor of the mixer, the blade having an outer end with a scraper for engaging feed material along at least a portion of the sidewall of the mixer.

10. The improved vertical feed mixer of claim 9 wherein the scraper angles inwardly so as to direct feed material inwardly.

11. The improved vertical feed mixer of claim 9 further comprising a deflector extending along the peripheral edge of the flighting so as to direct feed material inwardly.

12. The improved vertical feed mixer of claim 11 wherein the deflector has a mounting flange for attachment to the flighting and a blade extending upwardly above the flighting.

13. The improved vertical feed mixer of claim 11 further comprising a plurality of secondary deflectors mounted in spaced relation along the peripheral edge of the flighting.

14. The improved vertical feed mixer of claim 9 wherein the deflector is adjacent the leading edge of the flighting.

15. The improved vertical feed mixer of claim 9 wherein the deflector is substantially parallel to the peripheral edge of the flighting.

16. The improved vertical feed mixer of claim 9 further comprising a knife on the scraper to cut the feed material.

17. A method for mixing feed material in a vertical feed mixer having a floor and a sidewall defining a mixing chamber with an open upper end and a discharge opening, and a vertically oriented auger rotatably mounted within the mixing chamber, the auger including an auger shaft with flighting, the flighting having a leading edge and a peripheral edge, the method comprising:

loading feed material into the mixing chamber;

rotating the auger to mix the feed material in the chamber; and directing the material carried by the flighting inwardly with at least one deflector extending along the peripheral edge of the flighting.

18. The method of claim 17 further comprising scraping feed material from the sidewall with the deflector.

19. The method of claim 17 further comprising cutting the feed material with a knife on the deflector.

20. A method for mixing feed material in a vertical feed mixer having a floor and a sidewall defining a mixing chamber with an open upper end and a discharge opening, and a vertically oriented auger rotatably mounted within the mixing chamber, the auger including an auger shaft with flighting, the flighting having a leading edge and a peripheral edge, the method comprising:

loading feed material into the mixing chamber;

rotating the auger to mix the feed material in the chamber; and scraping feed material from adjacent the sidewall and directing the scraped material away from the sidewall.

* * * * *